United States Patent
Hu et al.

(10) Patent No.: US 6,566,650 B1
(45) Date of Patent: May 20, 2003

(54) INCORPORATION OF DIELECTRIC LAYER ONTO STHM TIPS FOR DIRECT THERMAL ANALYSIS

(75) Inventors: Chang Chaun Hu, Singapore (SG); Kin Leong Pey, Singapore (SG); Yung Fu Chong, Singapore (SG); Chim Wai Kin, Singapore (SG); Pavel Neuzil, Singapore (SG); Lap Chan, San Francisco, CA (US)

(73) Assignees: Chartered Semiconductor Manufacturing Ltd., Singapore (SG); National University of Singapore, Singapore (SG); Institute of Microelectronics, Singapore (SG)

( * ) Notice: Subject to any disclaimer, the term of this patent is extended or adjusted under 35 U.S.C. 154(b) by 331 days.

(21) Appl. No.: 09/664,418

(22) Filed: Sep. 18, 2000

(51) Int. Cl.⁷ .............................. B01D 59/44; H01J 49/00
(52) U.S. Cl. ..................... 250/281; 250/306; 250/307; 250/311
(58) Field of Search ............................ 250/281, 306, 250/307, 311; 369/126; 73/105; 374/137, 179, 208, 167; 338/22 S; 136/225, 232, 233

(56) References Cited

U.S. PATENT DOCUMENTS

| 3,893,058 | A | * | 7/1975 | Keith ........................ 338/22 S |
| 4,177,375 | A | * | 12/1979 | Meixner .................. 338/22 SD |
| 4,332,081 | A | * | 6/1982 | Francis ...................... 338/22 S |
| 5,441,343 | A | * | 8/1995 | Pylkki et al. ................ 250/307 |
| 5,488,350 | A | | 1/1996 | Aslam et al. ............ 338/225 D |
| 5,581,083 | A | | 12/1996 | Majumdar et al. .......... 250/306 |
| 5,811,802 | A | | 9/1998 | Gamble ...................... 250/306 |
| 5,929,438 | A | * | 7/1999 | Suzuki et al. ............... 250/306 |
| 5,969,238 | A | | 10/1999 | Fischer ........................ 73/105 |
| 6,038,101 | A | * | 3/2000 | Yoda et al. .................. 360/103 |
| 6,106,148 | A | * | 8/2000 | Moslehi et al. ................ 374/1 |
| 6,250,801 | B1 | * | 6/2001 | Bernard ...................... 374/208 |

FOREIGN PATENT DOCUMENTS

| JP | 63115042 | * | 5/1988 |
| JP | 05198148 | * | 8/1993 |
| SU | 872469 B | * | 10/1981 |

OTHER PUBLICATIONS

K. Lou et al., "Sensor nanofabrication, performance, and conduction mechanisms in scanning thermal microscopy", J. Vac. Sci. Technol. B 15(2), Mar./Apr. 1997, pp. 339–360.*

K. Luo et al., "Sensor Nanofabrication, Performance, and Conduction Mechanisms in Scanning Thermal Microscopy", J. Vac. Sci. Technol. B 15(2), Mar./Apr. 1997, pp. 349–360.

* cited by examiner

Primary Examiner—John R. Lee
Assistant Examiner—James P. Hughes
(74) Attorney, Agent, or Firm—George O. Saile; Rosemary L. S. Pike

(57) ABSTRACT

One of the limitations to current usage of scanning thermal microscopes arises when one needs to obtain a thermal map of an electrically biased specimen. Current practice is for the conductive parts of the specimen to be passivated to prevent excessive current leakage between the tip and the conductive sample. The present invention eliminates the need for this by coating the probe's microtip with a layer of insulation that is also a good thermal conductor. Examples of both thermocouple and thermistor based probes are given along with processes for their manufacture.

18 Claims, 2 Drawing Sheets

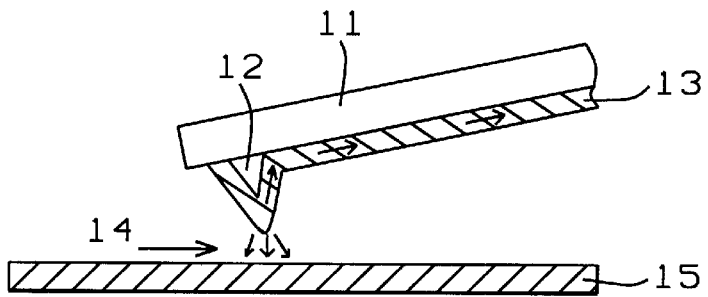
FIG. 1 - Prior Art
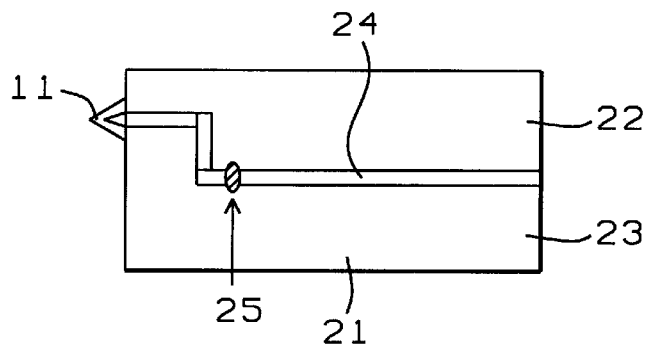
FIG. 2 - Prior Art
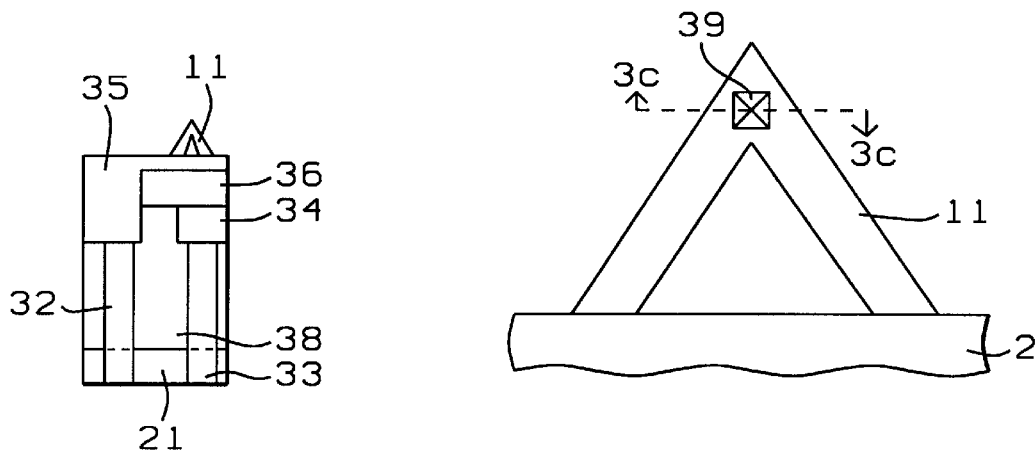
FIG. 3a                FIG. 3b

INCORPORATION OF DIELECTRIC LAYER ONTO STHM TIPS FOR DIRECT THERMAL ANALYSIS

FIELD OF THE INVENTION

The invention relates to the general field of atomic force microscopy with particular reference to performing scanning thermal microscopy on specimens that are conducting electricity.

BACKGROUND OF THE INVENTION

Scanning Thermal Microscopy (SThM) is a technique that uses the specimen's thermal conductivity as a contrast mechanism in imaging microscopic features. The temperature sensing probe in Atomic Force Microscopy (AFM) can be used for semiconductor material and device study such as locating hot spots created by short circuit defects in the sub micron regime.

Commercial SThMs use a miniature thermal resistor positioned at the end of a cantilever. If a small current is passed through the resistor, and the resistance is measured as the tip is scanned over the surface, a local temperature map of the specimen is produced based on the resistance changes. If, on the other hand, a large current is passed and the resistor temperature rises significantly above that of the specimen, the probe detects local changes in the local thermal conductivity of the sample. In the latter mode of operation, the thermal conductivity of the specimen, as presented at the surface, is an aggregate of any thermal conductivity variations down into the specimen. Changes in composition below the specimen surface will therefore produce a feature in the thermal map.

One of the limitations to current usage of the above probe is that if one needs to obtain the thermal map of an electrically biased specimen, the conductive parts of the specimen must be passivated to prevent excessive current leakage between the tip and the conductive sample. This is illustrated in FIG. 1 where microtip 12, coated with sensing layer 13, is seen to be located near the end of cantilever beam 11. If a current is being passed through 13 and/or through specimen layer 15, leakage, shown schematically as arrows 14, will occur between probe and specimen. The prior art solution to this has been to coat the specimen with a layer of insulation. In many cases, however, this may be difficult and/or undesirable to do.

Additionally, commercial resistive probes are often prone to short circuiting between the conductors should any conductive contaminants end up between the conductive leads that connect to the tips. This is illustrated in FIG. 2 where cantilever beam 11 is seen extending out from one end of insulating substrate 21. After fabrication of the sensing tip (as in FIG. 1, for example), the substrate was coated with a conductive material which was then formed into connecting leads 22 and 23 by laser machining trench 24 through the metal down to the substrate level. Since said trench is only about 25 microns wide, a particle of conductive material, such as 25, can, if it bridges trench 24, short circuit the leads 22 and 23.

The present invention enables SThM to be performed directly on electrically biased conductive samples. In addition, it minimizes the probability of its electrical conductors being shorted to each other by conductive contaminants.

A routine search of the prior art was performed and the following references of interest were found: Luo et al. in J. Vac. Sci. Technol. B 15(2) 349–359 discuss manufacturing techniques, some of which were used when the first embodiment of the present invention was first reduced to practice. U.S. Pat. No. 5,969,238 (Fischer) shows a thermoelectric probe tip process. U.S. Pat. No. 5,581,083 (Majumdar et al.) shows a sensor and tip for a scanning thermal microscopy, and U.S. Pat. No 5,811,802 (Gamble) shows a scanning microscope. Pylekki et al. (U.S. Pat. No. 5,441,343) show a thermal sensing scanning probe microscope using resistive sensors while Aslam et al. (U.S. Pat. No 5,488,350) show diamond film structures in different patterns for conducting, generating, and/or absorbing thermal energy.

SUMMARY OF THE INVENTION

It has been an object of the present invention to provide a scanning thermal microscope probe that may be used to scan a specimen through which an electric current is passing.

Another object of the invention has been that said probe be of the thermocouple type.

A further object of the invention has been that said probe be of the resistance thermometer type.

A still further object has been to provide processes for manufacturing of said novel probe types.

These objects have been achieved by coating the tips of both the above probe types with a layer of insulation that is also a good thermal conductor. This allows the probes to be used to scan specimens in which an electric current is passing without the presence of a leakage current between probe and specimen.

BRIEF DESCRIPTION OF THE DRAWINGS

FIG. 1 shows the cantilever beam and microtip of a scanning thermal microscope of the prior art.

FIG. 2 is a plan view of FIG. 1.

FIG. 3a is a plan view of a first embodiment of the present invention.

FIG. 3b is a closeup view of the beam end of FIG. 3a.

FIG. 4b is a cross-section through the microtip seen in FIG. 4a

DESCRIPTION OF THE PREFERRED EMBODIMENTS

The present invention solves the problems that were noted in the earlier section by depositing a dielectric layer over the SThM tip to prevent current leakage between the tip and the electrically biased sample. The dielectric is made of materials that possess high thermal conductivity so as not to degrade the thermal sensitivity of the probe. The thickness of this layer is sufficient to effectively prevent direct short to the electrically biased samples as well as to minimize degradation to the probe's thermal sensitivity.

We will describe two processes for manufacturing probes of this type. In the course of these descriptions, the structures of the two probes will also become apparent.

$1^{st}$ Process Embodiment

Referring now to FIG. 3a, the first process embodiment begins with the provision of a planar substrate 21 from which there extends cantilever beam 11. Microtip 39 is then formed near the far end of the beam on its lower surface (see closeup in FIG. 3b). Said microtip extends downwards and away from the lower surface of 11.

Figure 3C:
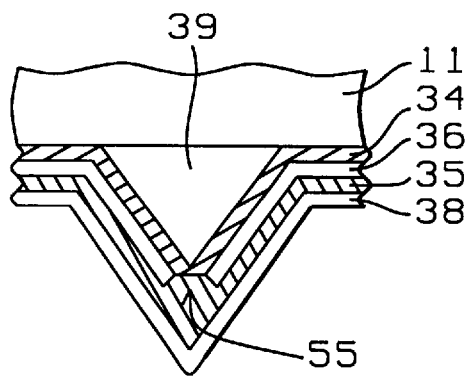
FIG. 3c is a cross-section through the microtip seen in FIG. 3b.

We refer now to both FIGS. 3a and 3c. Next, a metal layer is first deposited onto substrate 21 followed by a layer of an inert metal. Suitable materials for the metal include titanium or aluminum while suitable materials for the inert metal include platinum and gold. The two layers are then patterned and etched to form connecting leads 32 and 33. The inert metal serves to protect the metal against oxidation. Then, a buffer layer of the metal is deposited onto substrate 21 for good adhesion between the substrate 21 and metal layer 34 which is deposited onto both substrate 21 as well as cantilever beam 11, including microtip 39. On substrate 21, the buffer layer and metal layer 34 are patterned so as to connect metal layer 34 to lead 33. Layer 34 has a thickness between about 400 and 800 Angstroms.

The next step is deposition of insulating layer 36 over metal layer 34, including the microtip, and then patterning layer 36 to enable it to insulate layer 34 from layer 35 while at the same time not covering connecting lead 32. Insulation layer 36 has a thickness between about 800 and 1,200 Angstroms. Suitable materials include silicon oxide and silicon nitride. This is followed by the deposition of metal layer 35, also over both substrate and microtip, over insulating layer 36 and then patterning layer 35 so as to connect lead 32. Metal layer 35 has a thickness between about 400 and 800 Angstroms. As can be seen in FIG. 3c, layers 34 and 35 are separated from one another by layer 36 everywhere except at point 55 which is the thermocouple junction. The thermocouple junction can be formed by first bringing the probe tip into force-controlled contact with a metal-coated silicon substrate. With the scanner stationary, a voltage pulse is applied between the metal layer on the substrate (positive) and the metal film on the tip (negative). The high electric field in the immediate vicinity of the probe causes local metal evaporation, opening a hole only at the very end of the tip. Layer 36 at the tip will be exposed and then patterned and etched to expose underlying metal layer 34. With the masking layer still in place, the probe tip is capped with metal layer 35 to form the thermocouple junction only at the probe tip. Suitable materials for layers 34 and 35 include combinations of gold and nickel, gold and platinum and platinum and nickel.

There now follows a key feature of the present invention. Insulating layer 38 is deposited on nickel layer 35. It is important that, in addition to being electrically insulating, layer 38 also be a good thermal conductor. We have found that a thermal conductance greater than about 50 W/m.K should be adequate for proper operation of the present invention. Examples of suitable materials for layer 38 include diamond-like carbon, aluminum nitride, and silicon carbide. This enables the thermocouple junction to operate correctly even when in contact with a current carrying surface. Layer 38 has a thickness between about 200 and 500 Angstroms. A sufficient amount of layer 38 is removed from the surface of substrate 21 to expose leads 32 and 33 so that contact can be made to them.

2$^{nd}$ Process Embodiment

Figure 5:
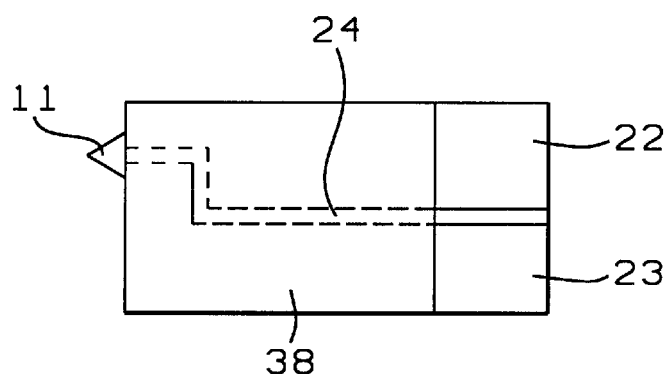
FIG. 5 is low scale view of FIG. 4a, showing the substrate and leads

Referring now to FIG. 5, the second process embodiment begins with the provision of a planar substrate 21 from which there extends cantilever beam 11. Microtip 39 is then formed near the far end of the beam on its lower surface. Said microtip extends downwards and away from the lower surface of 11.

Figure 4A:
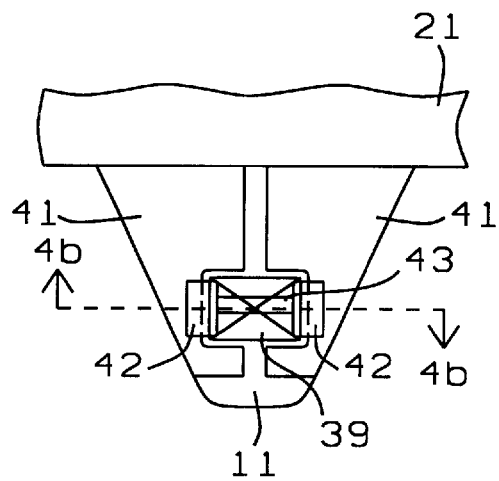
FIG. 4a is a closeup of the beam portion of a second embodiment of the present invention showing a thermistor element.
Figure 4B:
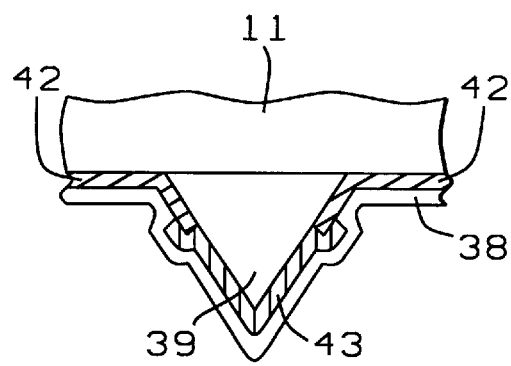

We refer now to both FIGS. 4a and 4b while continuing our reference to FIG. 5. An aluminum layer is deposited onto substrate 21 and cantilever beam 11 and then patterned in such a way that microtip 39 is not covered while the aluminum layer is given the form of two, non-touching, halves 41 each of which includes a contact electrode 42, said electrodes being located on opposing sides at the base of the microtip.

Using a focused ion beam, a layer of a thermistor material is then deposited in the shape of ribbon 43 that connects the contact electrodes 42. The thermistor material should have a temperature coefficient of resistance greater than about 3,900 ppm per ° C. Our preferred material for the thermistor has been platinum but other materials such as copper, aluminum, or tungsten could also have been used.

There now follows a key feature of the present invention. Insulating layer 38 is deposited over the entire structure except for a section of the substrate which is left uncovered so as to allow contact to leads 41. It is important that, in addition to being electrically insulating, layer 38 also be a good thermal conductor. We have found a thermal conductance greater than about 50 W/m.K to be adequate for proper operation of the present invention. Examples of suitable materials for layer 38 include diamond-like carbon, aluminum nitride, and silicon carbide. This enables the thermistor to operate correctly even when in contact with a current carrying surface. Layer 38 has a thickness between about 200 and 500 Angstroms.

While the invention has been particularly shown and described with reference to the preferred embodiments thereof, it will be understood by those skilled in the art that various changes in form and details may be made without departing from the spirit and scope of the invention.

What is claimed is:

1. A scanning thermal microscopy probe, comprising:
   a planar substrate from which there extends a cantilever beam having a far end and a lower surface;
   near said far end on said lower surface a microtip that extends away from said lower surface;
   a first metal layer on the substrate and on the cantilever beam, including the microtip;
   a first insulating layer on the first metal layer;
   a thermocouple junction over the microtip;
   a second metal layer on the first insulating layer, said second metal layer being in contact with the first metal layer only over the microtip; and
   on the second metal layer, a second insulating layer having a thermal conductivity greater than 50 W/m.K, which enables said thermocouple junction to operate correctly even when in contact with a current carrying surface.

2. The probe described in claim 1 further comprising, on the substrate a metal lead and an inert metal lead that are connected to said first and second metal layers respectively.

3. The probe described in claim 1 wherein the first metal layer has a thickness between 400 and 800 Angstroms and the second metal layer has a thickness between 400 and 800 Angstroms.

4. The probe described in claim 1 wherein the first insulation layer has a thickness between 800 and 1,000 Angstroms and is selected from the group consisting of silicon oxide and silicon nitride.

5. The probe described in claim 1 wherein the second insulation layer is selected from the group consisting of crystallographically cubic carbon, aluminum nitride, and silicon carbide.

6. The probe described in claim 1 wherein the second insulation layer has a thickness between 200 and 500 Angstroms.

7. A scanning thermal microscopy probe, comprising:

a planar substrate from which there extends a cantilever beam having a far end and a lower surface;

near said far end on said lower surface, a microtip, having a base, that extends away from said lower surface;

on the substrate and on the cantilever beam, a layer of aluminum patterned so as not to cover the microtip and having the form of two, non-touching, halves each of which includes a contact electrode, said electrodes being located on opposing sides at the base of the microtip;

a ribbon shaped layer of a thermistor material connecting the contact electrodes;

a pair of leads that are connected to the thermistor layer, said leads resulting from a trench in the aluminum layer on the substrate that extends down to the level of the substrate; and on the substrate and the cantilever beam, including the microtip, an insulating layer having a thermal conductivity greater than 50 W/m.K which enables said thermistor layer to operate correctly even when in contact with a current carrying surface and which prevents conductive dust particles from short circuiting the pair of leads.

8. The probe described in claim 7 wherein the thermistor material is selected from the group consisting of platinum, copper, aluminum, and tungsten.

9. The probe described in claim 7 wherein the thermistor material has a temperature coefficient of resistance greater than 3,900 ppm per ° C.

10. The probe described in claim 7 wherein the insulation layer is selected from the group consisting of crystallographically cubic carbon, aluminum nitride, and silicon carbide.

11. The probe described in claim 7 wherein the insulation layer has a thickness between 200 and 500 Angstroms.

12. A process for manufacturing a scanning thermal microscopy probe, comprising:

providing a planar substrate from which there extends a cantilever beam having a far end and a lower surface;

near said far end on said lower surface, forming a microtip that extends away from said lower surface;

depositing a first metal layer on the substrate and on the cantilever beam, including the microtip;

depositing a first insulating layer over the first metal layer;

depositing a second metal layer on the first insulating layer whereby a thermocouple junction can be formed at the microtip; and on the second metal layer, depositing a second insulating layer having a thermal conductivity greater than 50 W/m.K, thereby enabling said thermocouple junction to operate correctly even when in contact with a current carrying surface.

13. The process described in claim 12 wherein the second insulation layer is selected from the group consisting of crystallographically cubic carbon, aluminum nitride, and silicon carbide.

14. The process described in claim 12 wherein the second insulation layer has a thickness between 200 and 500 Angstroms.

15. The process described in claim 12 further comprising the step of forming a metal lead and an inert metal lead on the substrate, said leads being connected to the first and second metal layers respectively.

16. A process for manufacturing a scanning thermal microscopy probe, comprising:

providing a planar substrate from which there extends a cantilever beam having a far end and a lower surface;

near said far end on said lower surface, forming a microtip, having a base, that extends away from said lower surface;

depositing a layer of aluminum on the substrate and on the cantilever beam and patterning the aluminum so that the microtip is not covered and the aluminum layer has the form of two, non-touching, halves each of which includes a contact electrode, said electrodes being located on opposing sides at the base of the microtip;

by means of focused ion beam deposition, depositing a layer of a thermistor material in the shape of a ribbon that connects the contact electrodes;

in the aluminum layer on the substrate, laser milling a trench that extends down to the level of the substrate, thereby forming a pair of leads that are connected to the thermistor layer; and on the substrate and the cantilever beam, including the microtip, depositing an insulating layer having a thermal conductivity greater than 50 W/m.K, thereby enabling said thermistor layer to operate correctly even when in contact with a current carrying surface and preventing conductive dust particles from short circuiting the pair of leads.

17. The process described in claim 16 wherein the insulation layer is selected from the group consisting of crystallographically cubic carbon, aluminum nitride, and silicon carbide.

18. The process described in claim 16 wherein the insulation layer has a thickness between 200 and 500 Angstroms.

* * * * *

UNITED STATES PATENT AND TRADEMARK OFFICE
CERTIFICATE OF CORRECTION

PATENT NO.    : 6,566,650 B1
DATED         : May 20, 2003
INVENTOR(S)   : Chang Chuan Hu et al.

It is certified that error appears in the above-identified patent and that said Letters Patent is hereby corrected as shown below:

<u>Title page,</u>
Item [75], delete "Chang Chaun Hu" and replace it with -- Chang Chuan Hu --.

Signed and Sealed this

Ninth Day of September, 2003

JAMES E. ROGAN
*Director of the United States Patent and Trademark Office*